(12) United States Patent
Parise et al.

(10) Patent No.: US 10,754,428 B1
(45) Date of Patent: Aug. 25, 2020

(54) SYSTEMS, METHODS, AND DEVICES FOR AUDIO-TACTILE MAPPING

(71) Applicant: Facebook Technologies, LLC, Menlo Park, CA (US)

(72) Inventors: Cesare Valerio Parise, Seattle, WA (US); Shoaibur Rahman, Houston, TX (US); Elia Gatti, Bothell, WA (US); Majed Jamal Samad, Sherman Oaks, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/284,428

(22) Filed: Feb. 25, 2019

(51) Int. Cl.
  *G06F 3/048* (2013.01)
  *G06F 3/01* (2006.01)
  *H04R 3/04* (2006.01)

(52) U.S. Cl.
  CPC .............. *G06F 3/016* (2013.01); *G06F 3/011* (2013.01); *H04R 3/04* (2013.01)

(58) Field of Classification Search
  CPC ............ G06F 3/016; G06F 3/011; H04R 3/04
  USPC ........................................................ 715/702
  See application file for complete search history.

(56) References Cited

U.S. PATENT DOCUMENTS

| | | | | |
|---|---|---|---|---|
| 9,274,603 | B2* | 3/2016 | Modarres | G06F 3/165 |
| 9,818,271 | B2* | 11/2017 | Cruz-Hernandez | G08B 6/00 |
| 9,852,590 | B2* | 12/2017 | Bhatia | G08B 6/00 |
| 9,910,495 | B2* | 3/2018 | Weddle | G08B 6/00 |
| 10,198,073 | B2* | 2/2019 | Chaudhri | G06F 3/04817 |
| 10,216,277 | B2* | 2/2019 | Rihn | G06F 3/016 |
| 10,261,582 | B2* | 4/2019 | Saboune | G06F 3/041 |
| 10,268,275 | B2* | 4/2019 | Carter | G06F 3/011 |
| 10,416,774 | B2* | 9/2019 | Weddle | G06F 3/005 |
| 2014/0320436 | A1* | 10/2014 | Modarres | G06F 1/163 345/173 |
| 2014/0340209 | A1* | 11/2014 | Lacroix | G06F 3/165 340/407.2 |
| 2015/0070261 | A1* | 3/2015 | Saboune | G06F 3/016 345/156 |
| 2018/0129291 | A1* | 5/2018 | Weddle | G08B 6/00 |
| 2019/0339804 | A1* | 11/2019 | Gleeson | G06F 3/016 |

* cited by examiner

*Primary Examiner* — David Phantana-angkool
(74) *Attorney, Agent, or Firm* — FisherBroyles, LLP

(57) ABSTRACT

A method may include acquiring an audio signal, generating a haptic signal at frequencies that are based on a shift in frequencies of the audio signal, thereby causing the frequency of the haptic signal to match the frequency of the audio signal according to human perception and providing the haptic signal to a human user. Various other apparatuses, systems, and methods are also disclosed.

20 Claims, 11 Drawing Sheets

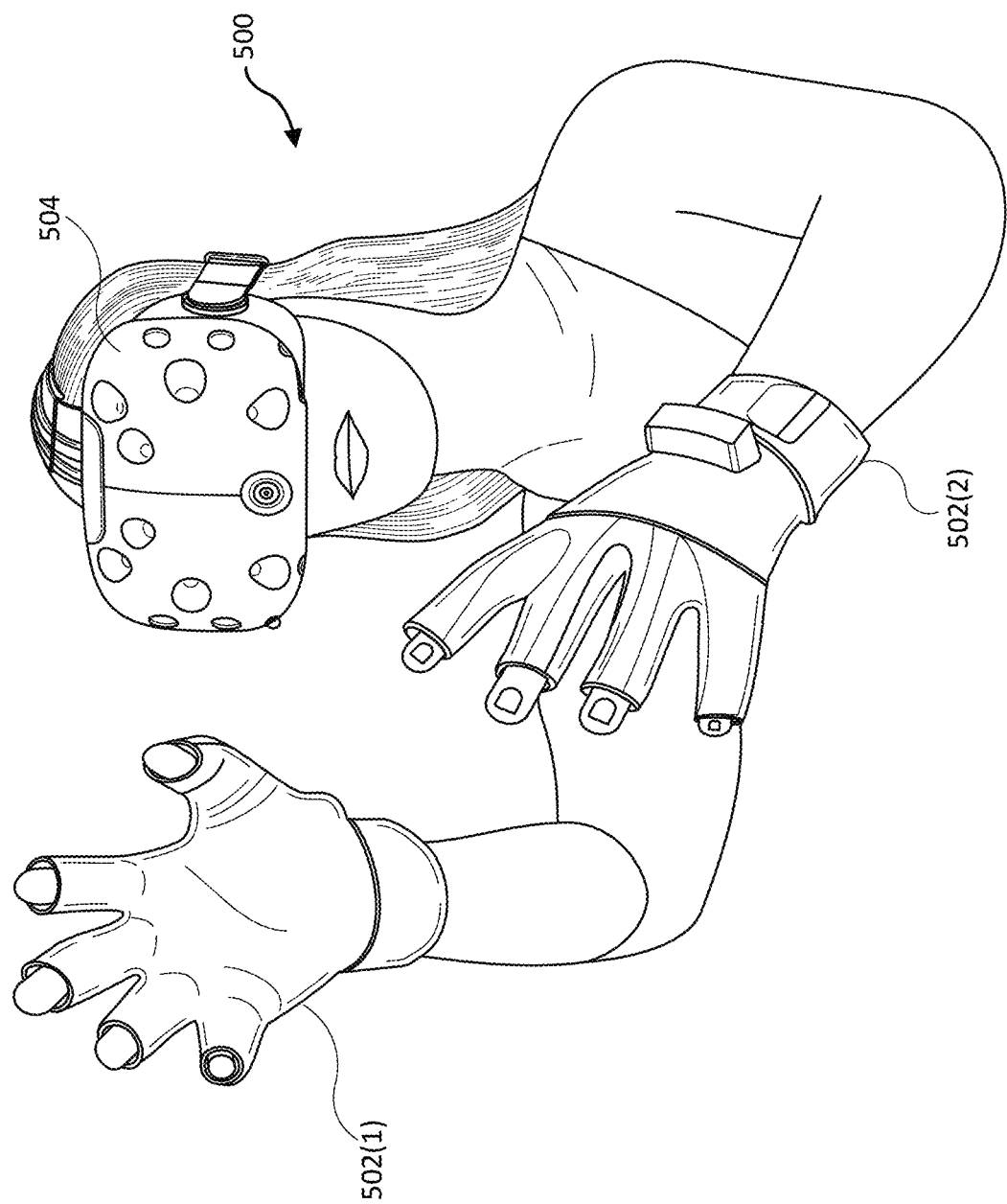

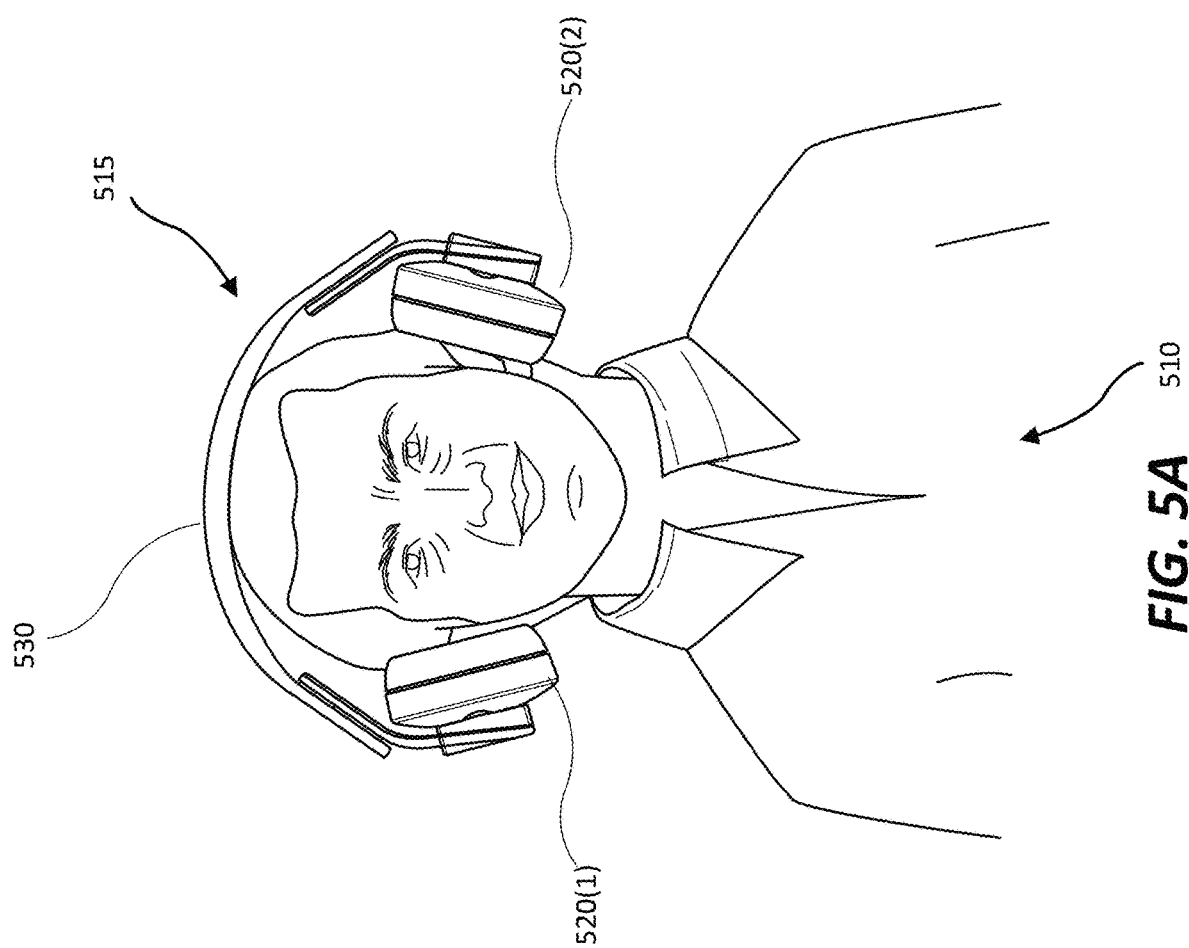

US 10,754,428 B1

SYSTEMS, METHODS, AND DEVICES FOR AUDIO-TACTILE MAPPING

BACKGROUND

Listening to audio content using a virtual-reality or augmented-reality head-mounted system may produce an immersive experience. By augmenting audio content with tactile sensory input (e.g., haptics) a listener may hear audio content and feel the audio content. Experiencing haptics while listening to audio content using a virtual-reality or augmented-reality system may improve the immersive experience.

Haptics is a tactile and/or force feedback technology that takes advantage of a user's sense of touch by applying haptic feedback effects (e.g., "haptic effects"), such as forces, vibrations, and motions, to the user. Devices, such as wearables, virtual-reality systems, augmented-reality systems, electronic devices, mobile devices, touchscreen devices, and personal computers, may be configured to generate haptic effects. Such devices may also play audio content, such as a digital audio signal. For example, such devices may include applications configured to play video content, such as a movie or video game, that contains an audio portion, or audio content, in addition to providing the haptic effects.

Virtual-reality or augmented-reality systems with haptic effects may enable users to travel through space and time, interact with friends in a three-dimensional world, or play video games in a radically redefined way. Virtual-reality or augmented-reality systems with haptic effects may also be used for purposes other than recreation—governments may use them for military training simulations, doctors may use them to practice surgery, and engineers may use them as visualization and audio aids.

In any use of a virtual-reality or augmented-reality system with haptic effects, making the experience as functional and pleasurable as possible for the user may be critical. However, delivering vibrotactile haptic effects at the same frequencies as corresponding audio content (e.g., playing the same waveform as audio and haptic content) may potentially interfere with a pleasurable experience for the user. For example, certain frequencies of the audio content, when provided as a haptic effect, may be perceived by the user to be a mismatch of the audio frequency, making the experience less compelling for the user.

SUMMARY

As will be described in greater detail below, the instant disclosure describes a variety of systems, methods and devices for warping the frequencies of an audio signal to produce a haptic signal that matches the frequency of the audio signal according to human perception.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 illustrates a perspective view of a user wearing a head-mounted display system and haptic devices.

FIG. 5A illustrates a user wearing a headphone with haptic devices.

Figure 1:
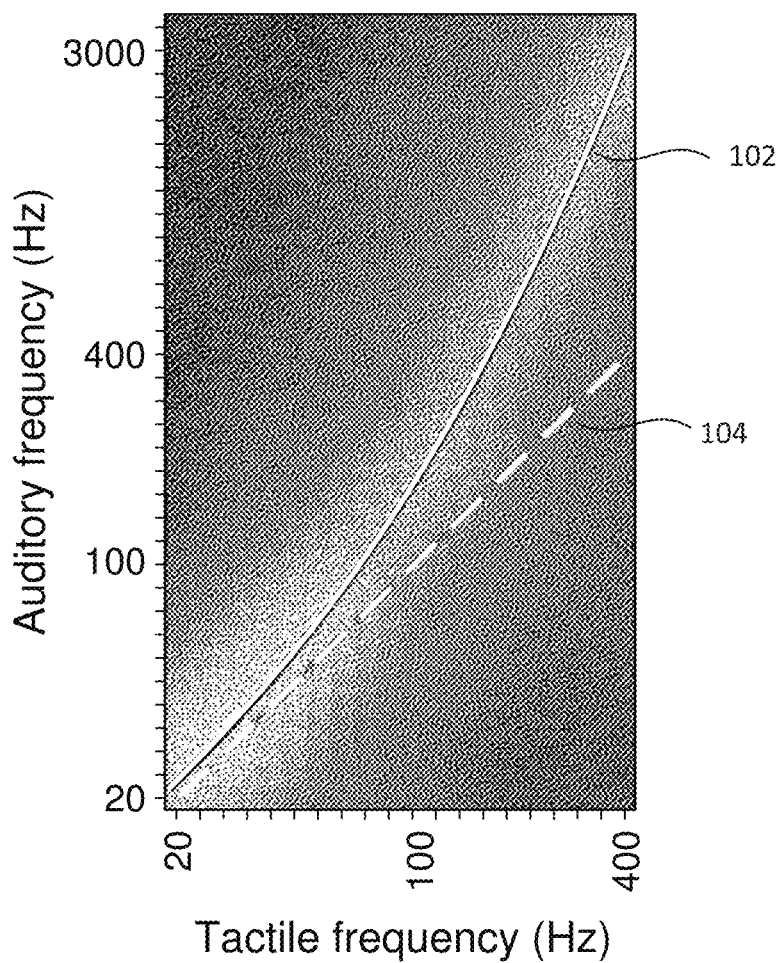
FIG. 1 illustrates a graph representing the perceptual mapping of acoustic and tactile frequencies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

This disclosure is generally directed towards generating a haptic signal by frequency warping an audio signal and/or generating an audio signal by frequency warping a haptic signal. As will be explained in greater detail below, a haptic signal generated by a frequency warped audio signal may provide a haptic sensory input that matches perceptually the content of the audio signal to a user. In some examples, an audio signal generated by a frequency warped haptic signal may provide an acoustic signal that matches perceptually the content of the haptic signal to a user.

A human user may be unable to perceive a haptic signal at the same frequencies of an audio signal (and vice-versa) due to the differences in transduction and/or processing across the two sensory modalities. By frequency warping the audio signal to generate a haptic signal that is perceived by the somatosensory system to be the same frequency as the audio signal, the methods of the present disclosure may be able to provide a human user with a haptic signal that is perceived by the user to represent the content of the audio signal. By frequency warping a haptic signal to generate an audio signal that is perceived by the human auditory system to be the same frequency as the haptic signal, the methods of the present disclosure may be able to provide a human user with an audio signal that is perceived by the user to match the content of the haptic signal.

Advantages of generating a haptic signal by frequency warping an audio signal, as described in this disclosure, may include enhanced perception of audio content. In some examples, systems described herein may provide the audio content to the user as both an audio signal and a haptic signal (e.g., synchronized together). The frequencies of the audio signal may be warped as described in detail below to provide a user with a haptic signal representing the audio content. By receiving both an audio signal and a haptic signal representing the audio content, a user may experience an enhanced and immersive experience of the audio content.

Another advantage may include real-time audio frequency shifting and conversion into haptic signals. For example, a user of a device (e.g., augmented reality device, virtual reality device, smartphone, etc.) may listen audio content (e.g., music, speech, gaming audio content, etc.) and may desire to have the frequencies warped (e.g., shifted) to different frequencies and converted into a haptic vibration pattern to augment the audio content. Such conversion may be done in a real-time manner in the device and the content may be conveyed to the user through any suitable audio reproduction device and/or haptic device. The frequency warping of audio content and conversion into a haptic vibration pattern to augment the audio content may occur without the need for human (e.g., user) intervention or artistic intuition of the user. The frequency warping of audio content and conversion into a haptic vibration pattern to augment the audio content may occur irrespective of conditions of the user (e.g., the user is in a noisy environment, hard of hearing, etc.).

Another advantage of the instant disclosure may include improving a media experience by enhancing audio signals within the media experience with haptic signals that are perceived by a user to match the audio signals. For example, an alternative reality system and/or a gaming system may produce haptic signals that appear to the user to match the frequencies of audio signals of the alternative reality system and/or gaming system.

Another advantage of the instant disclosure may include using a haptic mechanism of an electronic device to alert a user of specific events. For example, a unique vibration pattern provided to a user through a haptic device may be assigned to any number of events such that the unique vibration pattern may alert the user of the specific event. For example, ambient sounds (e.g., cars, fire alarms, emergency vehicles, dog barking, music, a recognized voice, phone ringing, door knock, etc.) may be detected by the electronic device. In response to detecting the ambient sound, a unique vibration pattern may be provided to the user through the haptic device within the electronic device to augment and/or replace the ambient sound with haptic feedback.

Another advantage may include using haptic feedback in connection with a musical instrument. For example, a hearing-impaired user may play a musical instrument and simultaneously receive haptic feedback that represents the music content.

Another example may include a user having a hearing impairment (e.g., difficulty in parsing speech content) that renders the user hard of hearing in a certain range of frequencies. By shifting that range of frequencies and converting the audio signal to a haptic vibration pattern that conveys sound information, an electronic device of the user may help the hearing-impaired user to perceive, understand, and/or enjoy the original content in the audio data. Additionally, in some contexts, a user of an electronic device may be in a noisy environment that may interfere with the user's perception of an audio signal. The electronic device may, accordingly, enhance the audio signal with a haptic signal that may be perceived by the user as corresponding to the frequencies of the audio signal. In some examples, systems described herein may provide only the haptic signal representing the audio content to a user and provide the audio content as an audio signal. In these examples, the haptic signal may replace the audio signal as a method of delivering the audio content to a user.

In some examples, an audio signal generated by a frequency warped haptic signal may provide an auditory sensory input representing the content of the haptic signal to a user.

FIG. 1 illustrates a graph of audio-tactile frequency mapping of tactile signal frequencies and audio signal frequencies. As shown in FIG. 1 and as will be explained in greater detail below, human perception of tactile frequencies may not always match human perception of corresponding audio frequencies. The graph of FIG. 1 shows a heatmap that represents the accuracy of matching acoustic and tactile frequencies as measured by a psychophysical experiment on humans. Plot 102 represents the perceptual mapping of acoustic and tactile frequencies. Plot 104 represents an identity line in which physical matching of frequencies corresponds to perceptual mapping. The deviation between plot 102 and plot 104 may demonstrate that physically matching frequencies may not correspond to perceptually matching frequencies. Thus, for example, humans may tend to perceive high audio frequencies as corresponding to relatively lower tactile frequencies. Referring to FIG. 1, the horizontal axis represents a log plot of tactile signal frequencies in the range of 20 to 400 Hz. The vertical axis represents a log plot of audio signal frequencies in the range of 20 to 3600 Hz. Plot 102 represents perceptual audio-tactile frequency mapping. For example, an acoustic signal of approximately 20 Hz may be perceptually matched to a haptic vibration of approximately 20 Hz. However, an acoustic frequency of approximately 3000 Hz may be matched to a haptic vibration of approximately 400 Hz.

Figure 2:
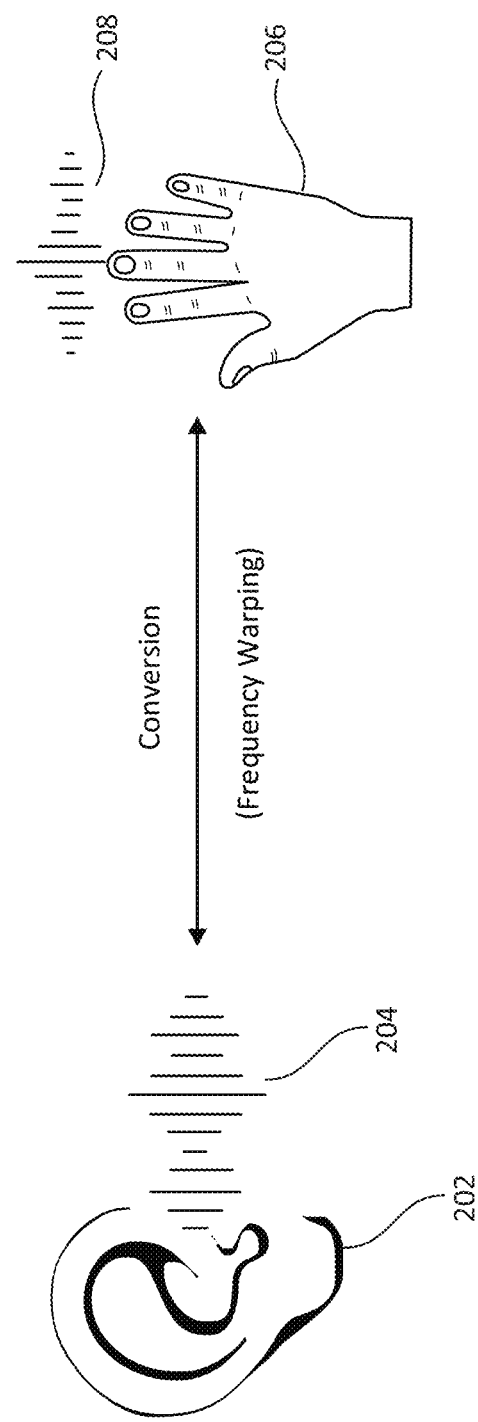
FIG. 2 illustrates frequency warping of an audio signal to a haptic signal.

FIG. 2 illustrates the frequency warping of an audio signal to a haptic signal and the frequency warping of a haptic signal to an audio signal. Referring to FIG. 2, audio signal 204 may be heard by a human's auditory system 202 at frequencies representing content of the audio signal. One or more of the systems described herein may warp audio signal 204 such that the frequencies of audio signal 204 are shifted to generate perceptually matching haptic signal 208. Haptic signal 208 may be perceived by the human's somatosensory systems, such as hand 206, so that the human perceives the frequencies of the audio signal and the haptic signal as matching (even though, e.g., haptic signal 208 was generated by altering frequencies identified in audio signal 204). In some examples, the shifting of frequencies may be bi-directional. For example, systems described herein may shift the frequencies of audio signal 204 to generate a matching haptic signal 208 and/or may shift the frequencies of haptic signal 208 to generate a matching audio signal 204.

Figure 3:
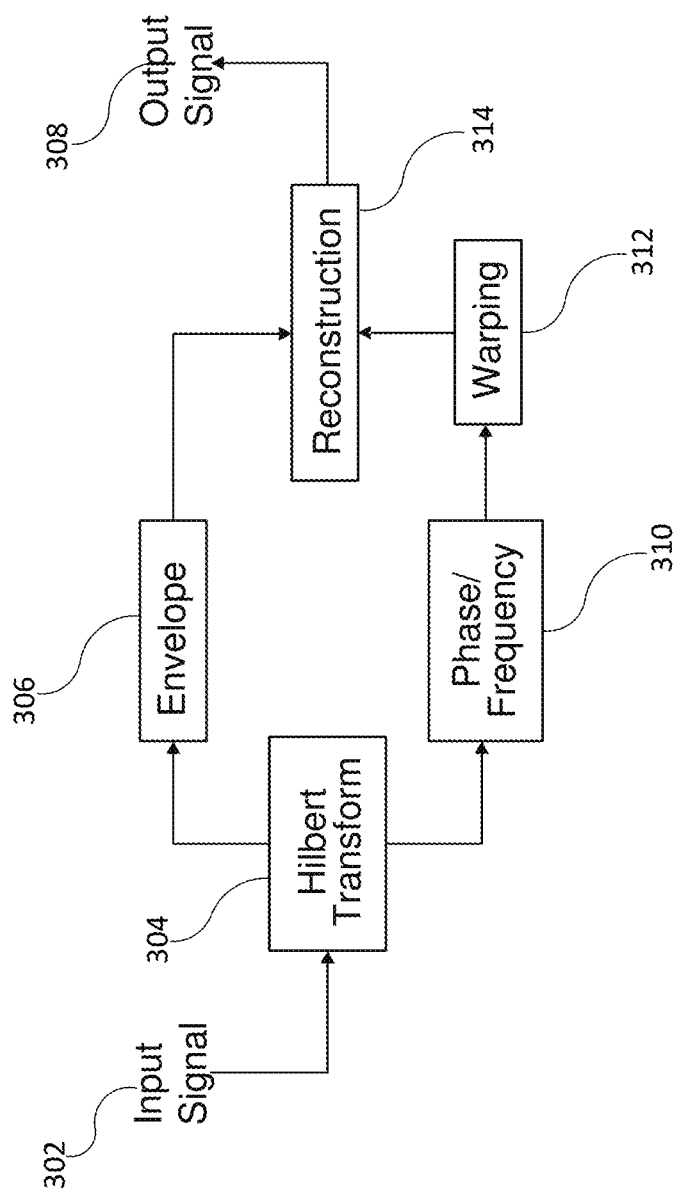
FIG. 3 illustrates a block diagram of a method for frequency warping of an audio signal to a haptic signal.

FIG. 3 illustrates a block diagram of an example method of frequency warping an audio signal to a haptic signal. In some examples, the method of FIG. 3 may be any suitable method that may be used to generate a perceptual audio-tactile frequency mapping. For example, input signal 302 may represent an audio signal. The method may provide input signal 302 to Hilbert transform block 304. In some examples, Hilbert transform block 304 may shift the phase of input signal 302. For example, Hilbert transform block 304 may shift the phase of input signal 302 by 90 degrees. Input signal 302, transformed by Hilbert transform 304, may be further processed by phase/frequency block 310. In some examples, phase/frequency block 310 may perform a phase and/or frequency shift of the signal. The phase and/or frequency shifted signal may be further processed by warping block 312. The frequency shift performed by the method may map the audio signal to the haptic signal according to any suitable mapping relationship. For example, the relationship between the frequency of the audio signal to the matched frequency of the haptic signal may be non-linear. In some examples, when the input signal is an audio signal, warping block 312 may perform a non-linear downward shift in all frequencies and/or a subset of frequencies of the audio signal. In some examples, when the input signal is a haptic signal, warping block 312 may perform a non-linear upward shift in all frequencies and/or a subset of frequencies of the haptic signal. In some examples, when the input signal is an audio signal, warping block 312 may perform a linear downward shift in all frequencies and/or a subset of frequencies of the audio signal. In some examples, when the input signal is a haptic signal, warping block 312 may perform a linear upward shift in all frequencies and/or a subset of frequencies of the haptic signal. In some examples, input signal 302, transformed by Hilbert transform 304, may be further processed by envelope block 306. In some examples, envelope block 306 may include magnitude information and perform a magnitude shift of the signal. Envelope block 306 may increase or decrease the magnitude of the signal in all frequencies and/or a subset of frequencies of the signal. Reconstruction block 314 may generate output signal 308 by reconstruction of the signals output from warping block 312 and envelope block 306. Reconstruction block 314 may reconstruct the signals output from warping block 312 and envelope block 306 by, without limitation, combining the signals, further processing the signals, and/or transforming the signals. In some examples, the haptic signal may be transformed (e.g. warped) to cause the haptic signal to match human perception of the audio signal by frequency warping the audio signal.

Figure 4:
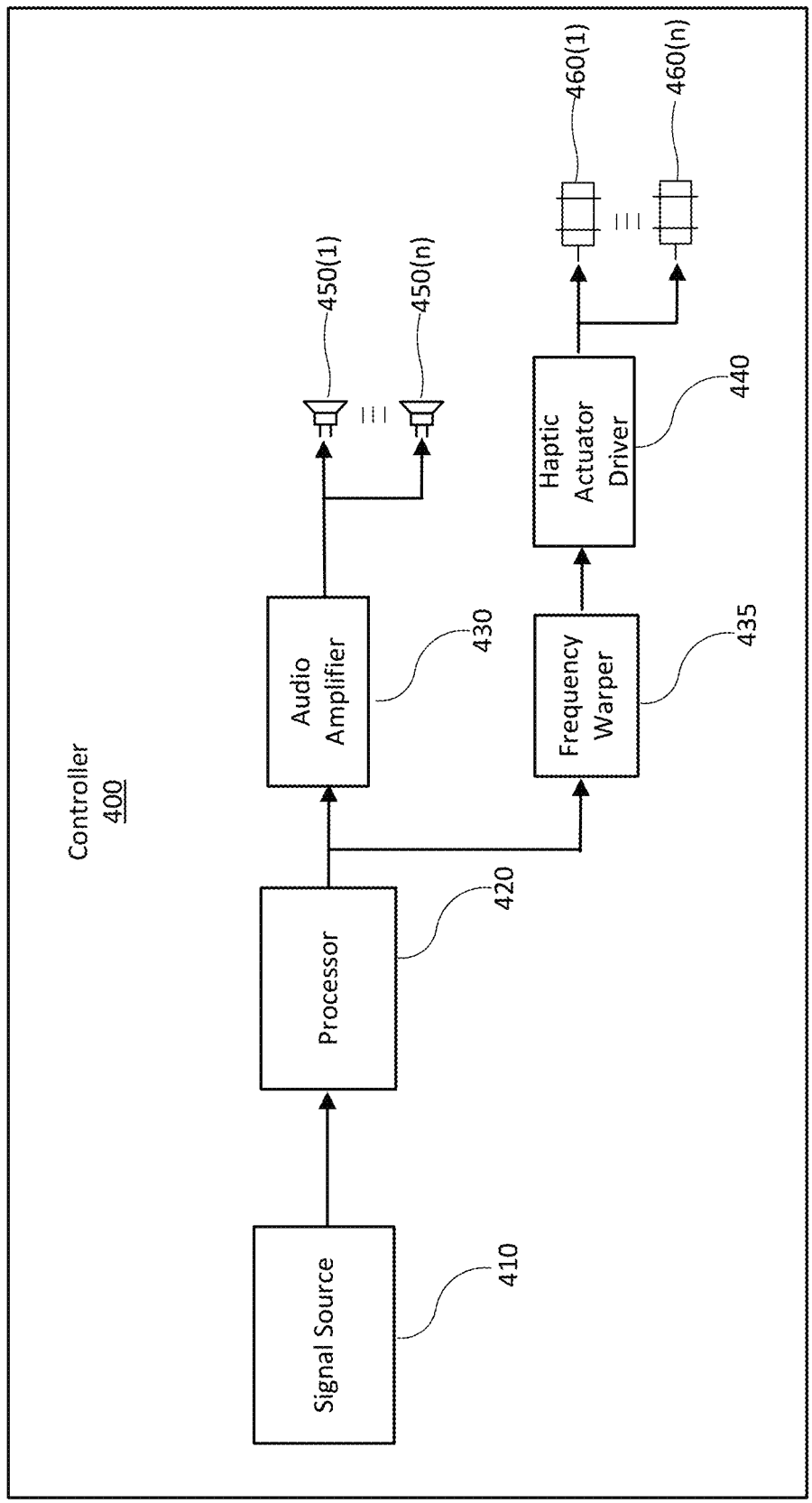
FIG. 4 illustrates a block diagram of a method for providing an audio signal and frequency warped haptic signal to a user.

FIG. 4 illustrates a block diagram of a method for providing an audio signal and/or a frequency warped haptic signal to a user. Referring to FIG. 4, signal source 410 may include an audio signal. In some examples, the audio signal may include an electrical signal representing audio content provided to processor 420. The audio signal may include, without limitation, audio content in the frequency range of human hearing in the form of sound, music, and/or speech. In some examples, the audio signal may be retrieved, without limitation, from memory storage, a server, a sensor, the Internet, and/or from a communication port. In some examples, the audio signal may be frequency warped to a haptic signal and the audio signal and/or the frequency warped haptic signal may be stored in memory storage. The stored audio signal and/or the stored frequency warped haptic signal may then be retrieved and played back by a user without the need for real-time frequency warping conversion. The audio signal may include output from a microphone that captures ambient sound. The audio signal may be analog and/or digital. In some examples, the audio signal may be encoded using an encoding method, examples of which include, without limitation, AAC, AMR, MP3, PCM, WAV, AIFF, MPEG, etc. Processor 420 may decode the encoded audio source, convert the decoded digital audio signal to an analog audio signal and provide the analog audio signal to audio amplifier 430. In some examples, audio amplifier 430 may control the amplitude of the analog audio signal and drive audio transducers 450(1) to 450(n). The output of audio transducers 450(1) to 450(n) may provide audio content to a human user for listening to the audio content in signal source 410. The analog audio signal output from processor 420 may be warped by frequency warper 435. In some examples, frequency warper 435 may include some or all of the components of the block diagram of FIG. 3.

In some examples, the frequency-warped signal from frequency warper 435 may be provided to haptic actuator driver 440. Haptic actuator driver 440 may drive haptic devices 460(1) to 460(n). Haptic actuator driver 440 may include an amplifier to provide sufficient power and control to drive haptic devices 460(1) to 460(n). The amplifier may independently control the frequency and/or intensity of the tactile sensation generated by haptic devices 460(1) to 460(n). In some examples, haptic devices 460(1) to 460(n) may provide a haptic signal to a human user. In some examples, haptic devices 460(1) to 460(n) may provide the human user with tactile sensation including, without limitation, a vibration, a force variation, or an electric stimulus. In some examples, haptic devices 460(1) to 460(n) may create a sense of touch using mechanical stimulation. Haptic devices 460(1) to 460(n) may be any type of haptic device that may independently generate the frequency and/or intensity of the tactile sensation. Haptic devices 460(1) to 460(n) may create a mechanical stimulation and/or a vibration by an eccentric rotating mass actuator. Haptic devices 460(1) to 460(n) may consist of an unbalanced weight attached to a motor shaft or piezoelectric actuator. As the shaft rotates, the spinning of the irregular mass causes the actuator, and in turn, haptic devices 460(1) to 460(n) to shake. In some examples, haptic devices 460(1) to 460(n) may be linear resonant actuators (LRAs) which may have a mass spring system. LRAs may use magnetic fields and electrical currents to create a force that drives a magnetic mass in a linear motion that causes the displacement of the LRA and thereby the vibration force. In some examples, LRAs may have a narrow band frequency response. However, the methods of the present disclosure may extend the perceived frequency response of LRAs by using a computational model that reflects how a user's brain combines frequency information across auditory and tactile senses. The model may create a weighted average between the frequencies of the audio signal and the frequencies of the haptic signals based on the frequency mappings shown in the graph of FIG. 1. Haptic devices 460(1) to 460(n) may be piezo actuators which use piezo-electric materials to bend a mass up and down depending on the applied voltage. In some examples, haptic devices 460(1) to 460(n) may be voice coils that provide a motive force to an actuator by passing current through the voice coil to create a magnetic field that drives the actuator. Haptic devices 460(1) to 460(n) may provide a haptic stimulus to a human user that allows the human user to perceive the content from signal source 410. In some examples, the content of signal source 410 may be provided to a human user as both an audio signal and a haptic signal in which the audio signal and the haptic signal are in temporal synchrony (e.g. synchronized in time). Providing both an audio signal and a haptic signal in which the audio signal and the haptic signal are in temporal synchrony to a user may create a multimodal sensory experience for the user thereby increasing the quality of the content consumption by the user.

In some examples, haptic devices 460(1) to 460(n) may have a broadband frequency response and be able to provide a haptic stimulus to a human user across a wide range of frequencies. The range of frequencies of the haptic stimulus may be in the range of 1 Hz to over 600 Hz. In some examples, haptic devices 460(1) to 460(n) may have a narrow-band frequency response and may only provide a haptic stimulus to a human user across a narrow range of frequencies. Haptic devices 460(1) to 460(n) may be narrow-band devices and each device may have a different frequency response band. Due to the resonance of the haptic device, each of haptic devices 460(1) to 460(n) may have a frequency band corresponding to its resonant frequency. In order to provide a wide band haptic stimulus to a user, haptic devices 460(1) to 460(n) may each have a different frequency response band. For example, haptic device 460(1) may have a low frequency response band, haptic device 460(2) may have a mid-range frequency response band, and haptic device 460(3) may have a high frequency response band. In order to provide a wideband haptic stimulus, haptic actuator driver 440 may direct lower frequencies of the haptic signal to haptic device 460(1), mid-range frequencies of the haptic signal to haptic device 460(2), and higher frequencies of the haptic signal to haptic device 460(3). In some examples, filtering and/or shifting frequencies of the haptic signal to compensate for frequency response characteristics of the haptic device may create a more compelling experience for a user receiving the haptic stimulus.

FIG. 5 illustrates a perspective view of a user wearing a head-mounted display system and haptic devices. FIG. 5 shows human user 500 wearing head-mounted display system 504. Head-mounted display system 504 may include an artificial (e.g., virtual and/or augmented) reality system which may include a variety of types of sensory feedback mechanisms. For example, head-mounted display system 504 may include display devices for providing visual content to user 500. The display device may include one or more liquid crystal displays (LCDs), light emitting diode (LED) displays, organic LED (OLED) displays, and/or any other suitable type of display screen. Head-mounted display system 504 may also include one or more audio transducers for providing audio content to user 500. Head-mounted display system 504 may include audio transducers 450(1) to 450(n) for providing audio content to user 500. In some examples, audio transducers 450(1) to 450(n) may include voice coil speakers, ribbon speakers, electrostatic speakers, piezoelectric speakers, bone conduction transducers, cartilage conduction transducers, and/or any other suitable type or form of audio transducer. Head-mounted display system 504 may also include input audio transducers for receiving audio input and may include condenser microphones, dynamic microphones, ribbon microphones, and/or any other type or form of input transducer. In some examples, head-mounted display system 504 may include haptic devices such as haptic devices 460(1) to 460(n). Haptic devices 460(1) to 460(n) in head-mounted display system 504 may provide tactile sensory inputs to user 500. Gloves 502(1) and 502(2) may also provide tactile sensory inputs to user 500. Gloves 502(1) and 502(2) may include haptic devices 460(1) to 460(n) to provide tactile sensory inputs to user 500 in the form of haptic feedback and/or force feedback. In some examples, haptic devices that provide tactile sensory inputs to user 500 in the form of haptic feedback and/or force feedback may include any wearable device such as vests, arm bands, backpacks, wristbands, etc. The haptic feedback provided by gloves 502(1) and 502(2) may provide user 500 with simulated touch feedback and/or natural interaction with a surrounding environment. The simulated realistic touch feedback provided by gloves 502(1) and 502(2) may also enable additional industrial and enterprise applications including, without limitation, remote machine repair, remote medicine, and employee training. Gloves 502(1) and 502(2) may also include tactile force and/or position sensors to sense the position, orientation, and/or force associated with the hands and/or fingers of user 500. In addition, gloves 502(1) and 502(2) may provide haptic signals generated by systems described herein to correspond to audio content provided in a simulated environment. In some examples, haptic devices 460(1) to 460(n) may provide tactile sensory input to user 500 in temporal synchrony (e.g. synchronization) with video content and audio content provided to user 500 via audio transducers 450(1) to 450(n). In some examples, a single transducer device may provide both audio and haptic signals to user 500.

FIG. 5A illustrates a user wearing a headphone with haptic devices. User 510 may wear headphone 515 to listen to audio content. Headphone 515 may include two speaker assemblies 520(1) and 520(2) headband 530. Headband 530 may be configured to rest on the head of user 510 and to support speaker assemblies 520(1) and 520(2). Headband 530 may also be configured to position speaker assemblies 520(1) and 520(2) on and/or over the ears of user 510 such that sound from speaker assemblies 520(1) and 520(2) may be heard by user 510. In some examples, headphone 515 may include ear bud speaker assemblies that may be inserted into the ears of user 510. Speaker assemblies 520(1) and 520(2) may include cushions for comfort when worn over the ears of user 510. Speaker assemblies 520(1) and 520(2) may further include audio transducers 450(1) to 450(n) configured to emit sound at audible frequencies. In some examples, speaker assemblies 520(1) and 520(2) may further include haptic devices 460(1) to 460(n) configured to provide haptic signals (e.g., vibrations) that may be felt by user 510. In some examples, the audio content consumed by user 510 may be provided to user 510 as both an audio signal from audio transducers 450(1) to 450(n) and a haptic signal from haptic devices 460(1) to 460(n) in which the audio signal and the haptic signal are in temporal synchrony. Providing both an audio signal and a haptic signal in which the audio signal and the haptic signal are in temporal synchrony to user 510 may create an enhanced multimodal sensory experience for the user. Headphone 515 may direct certain frequencies of the audio content to audio transducers 450(1) to 450(n) and direct certain frequencies of the audio content to haptic devices 460(1) to 460(n). In some examples, headphone 515 may include filters (e.g., low-pass, high-pass, etc.) such that the filters split the audio content into medium to high frequencies (i.e., non-bass frequencies), and lower frequencies (e.g., bass). At least some of the frequencies of the medium to high frequencies and the bass frequencies may at least partially overlap. For example, headphone 515 may be configured to emit some bass frequencies (e.g., a subwoofer) that are further enhanced by haptic devices 460(1) to 460(n).

Figure 6:
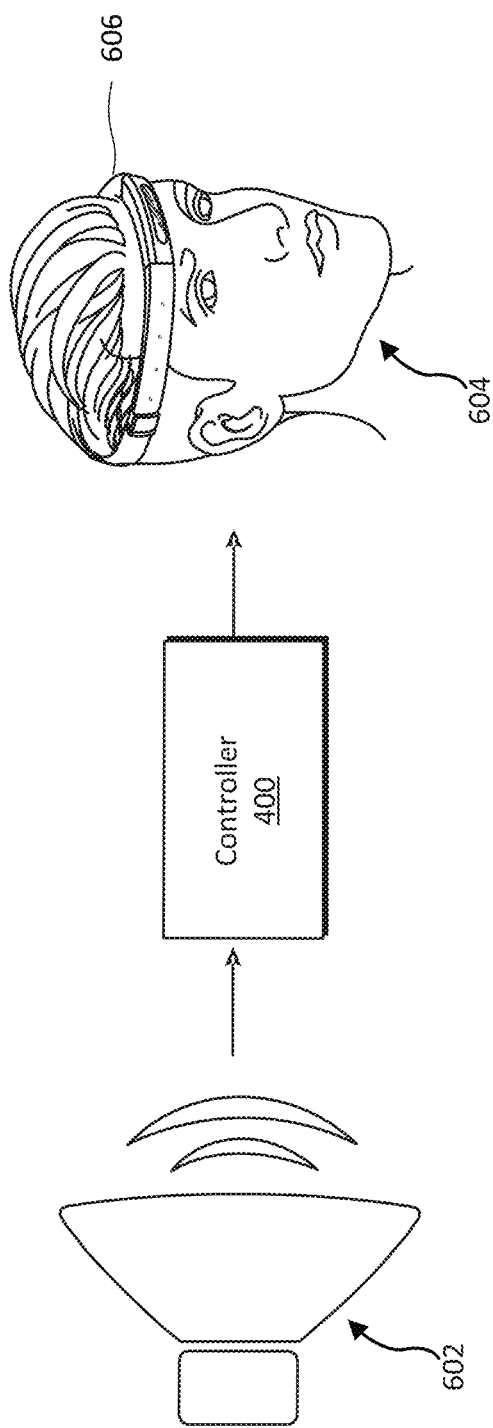
FIG. 6 illustrates a user with hearing impairment receiving a haptic signal representing the content of an audio signal.

FIG. 6 illustrates a user with hearing impairment receiving a haptic signal representing the content of an audio signal. In some examples, human user 604 may be hard of hearing (e.g., hearing impaired) and may receive haptic signals that represent the content of an audio signal. The audio signal may include, without limitation, ambient sounds, speech, music, and gaming content. Audio source 602 may generate and/or store audio content and provide the audio content to controller 400. As described in detail above, controller 400 may transform the audio signal into a haptic signal. The audio signal may be transformed (e.g. warped) into the haptic signal to match the frequency of the audio signal according to the perception of human user 604. The haptic signal representing the audio content may be provided to human user 604 by haptic device 606. Haptic device 606 may be worn by human user 604 on any portion of the human's body. Human user 604 may wear the haptic device, without limitation, on a portion of the human user's head, a wrist, a hand, on the chest, or the skin of the ears. In some examples, by providing a haptic signal to human user 604 that represents audio content, hearing impaired human user 604 may be able to perceive and understand the audio content.

Figure 7:
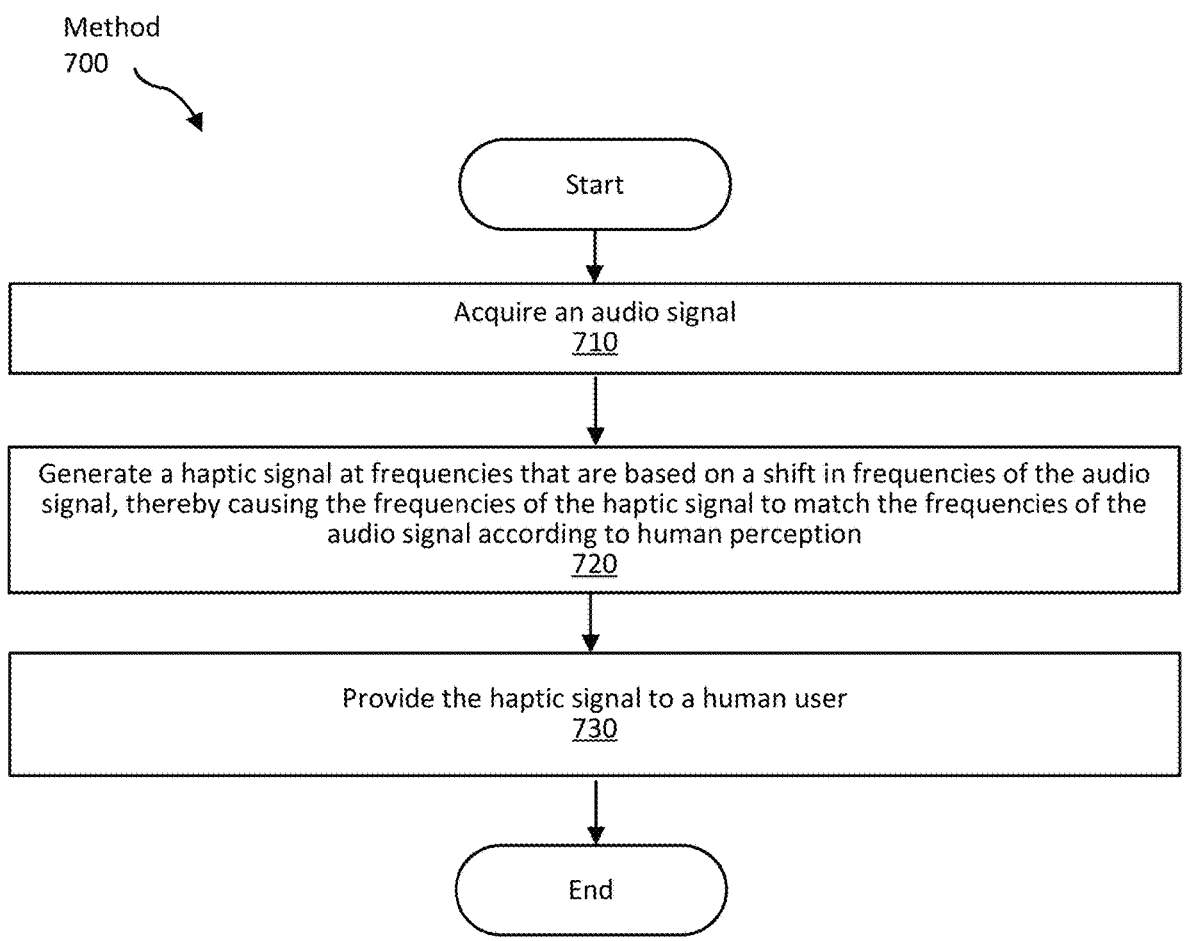
FIG. 7 is flow chart of a method of frequency warping an audio signal to a haptic signal.

FIG. 7 illustrates a flow chart of an example method 700 of frequency warping an audio signal to produce a haptic signal. As shown in FIG. 7, the method may include, at step 710, acquiring an audio signal. At step 720, the method may include generating a haptic signal at frequencies that are based on a shift in frequencies of the audio signal, thereby causing the frequencies of the haptic signal to match the frequencies of the audio signal according to human perception. At step 730, the method may include providing the haptic signal to a human user.

In some examples, the relationship between the frequencies of the audio signal to the matched frequencies of the haptic signal may be non-linear.

In some examples, generating the haptic signal may be based on a non-linear shift in a subset of the frequencies of the audio signal.

In some examples, generating the haptic signal may be based on a downward shift in a subset of the frequencies of the audio signal.

In some examples, the method may further include providing the audio signal to the human user.

In some examples, the method may further include providing the haptic signal via a haptic device in temporal synchrony with the audio signal being received by the human user.

In some examples, generating the haptic signal to cause the haptic signal to match human perception of the audio signal may include frequency warping the audio signal.

In some examples, generating the haptic signal may include shifting frequencies of the haptic signal to compensate for a frequency response characteristic of the haptic device.

In some examples, generating the haptic signal at the frequencies that are based on the shift in the frequencies of the audio signal may include a Hilbert transform.

In some examples, the method may further include generating the audio signal based on the shift in the frequencies of the haptic signal.

In one example, a system comprising one or more physical processors and one or more memories coupled to one or more of the physical processors, the one or more memories comprising instructions operable when executed by the one or more physical processors to cause the system to perform operations including acquiring an audio signal. In some examples, the operations may further include generating a haptic signal at frequencies that are based on a shift in frequencies of the audio signal, thereby causing the frequencies of the haptic signal to match the frequencies of the audio signal according to human perception. In some examples, the operations may further include providing the haptic signal to a human user.

In some examples, the relationship between the frequencies of the audio signal to the matched frequencies of the haptic signal may be non-linear.

In some examples, generating the haptic signal may be based on a non-linear shift in a subset of the frequencies of the audio signal.

In some examples, generating the haptic signal may be based on a downward shift in a subset of the frequencies of the audio signal.

In some examples, the operations may further include providing the audio signal to the human user.

In some examples, the operations may further include providing the haptic signal via a haptic device in temporal synchrony with the audio signal being received by the human user.

In some examples, generating the haptic signal to cause the haptic signal to match human perception of the audio signal may include frequency warping the audio signal.

In some examples, generating the haptic signal may include shifting frequencies of the haptic signal to compensate for a frequency response characteristic of the haptic device.

In some examples, generating the haptic signal at the frequencies that are based on the shift in the frequencies of the audio signal may include a Hilbert transform.

In one example, a computer-readable medium comprising computer-readable instructions that, when executed by at least one processor of a computing device, may cause the computing device to acquire an audio signal. In some examples, the instructions when executed may cause the computing device to generate a haptic signal at frequencies that are based on a shift in frequencies of the audio signal, thereby causing the frequencies of the haptic signal to match the frequencies of the audio signal according to human perception. In some examples, the instructions when executed may cause the computing device to provide the haptic signal to a human user.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 800 in FIG. 8. Other artificial reality systems may include an NED that also provides visibility into the real world (e.g., AR system 900 in FIG. 9) or that visually immerses a user in an artificial reality (e.g., VR system 1000 in FIG. 10). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 8:
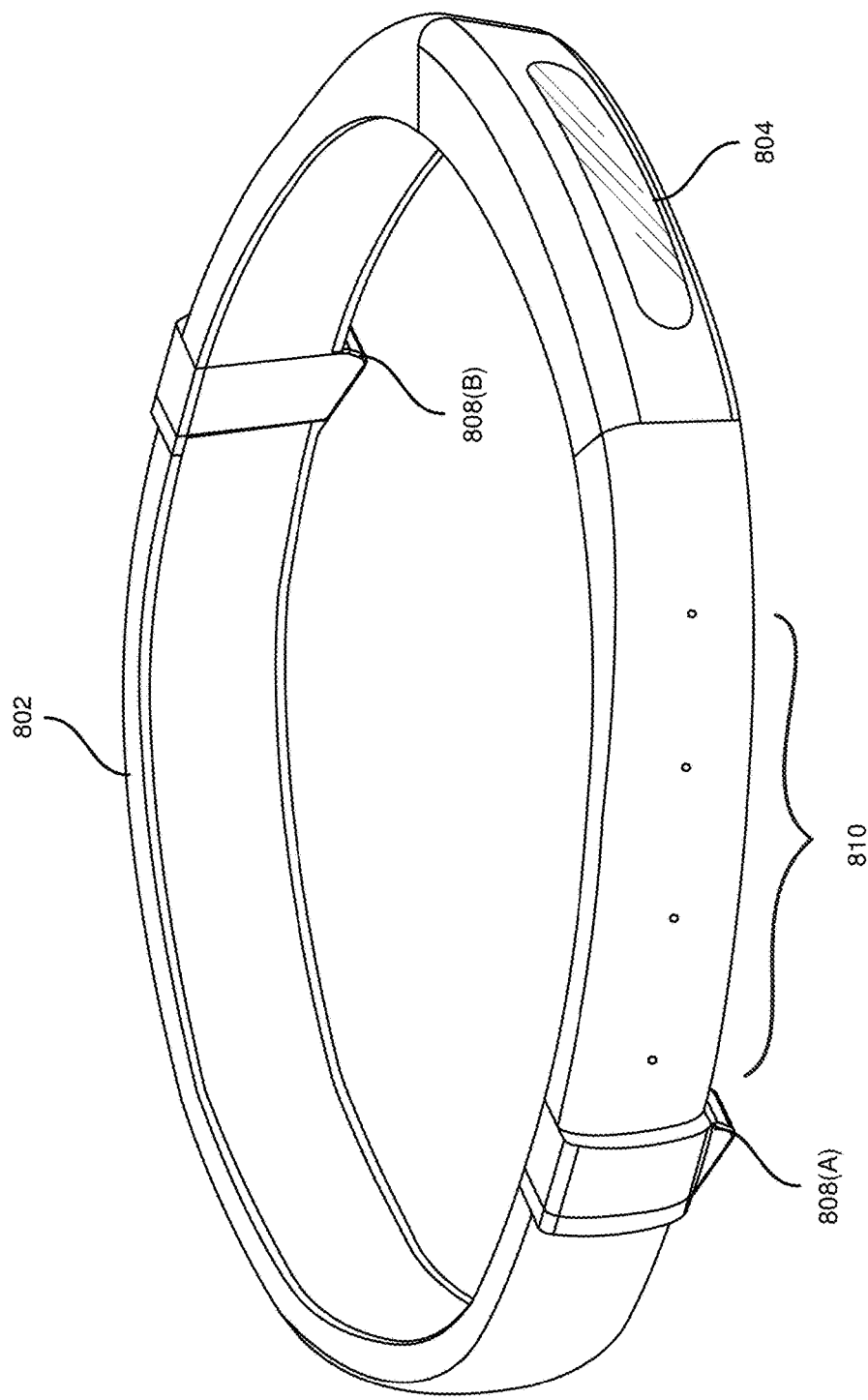
FIG. 8 illustrates a wearable device dimensioned to fit about a body part.

Turning to FIG. 8, AR system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. AR system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, AR system 800 may not necessarily include an NED positioned in front of a user's eyes. AR systems without NEDs may take a variety of forms, such as head bands, hats, hair bands, belts, watches, bands, ankle bands, rings, neckbands, necklaces, chest bands, eyewear frames, and/or any other suitable type or form of apparatus. While AR system 800 may not include an NED, AR system 800 may include other types of screens or visual feedback devices (e.g., a display screen integrated into a side of frame 802).

Figure 9:
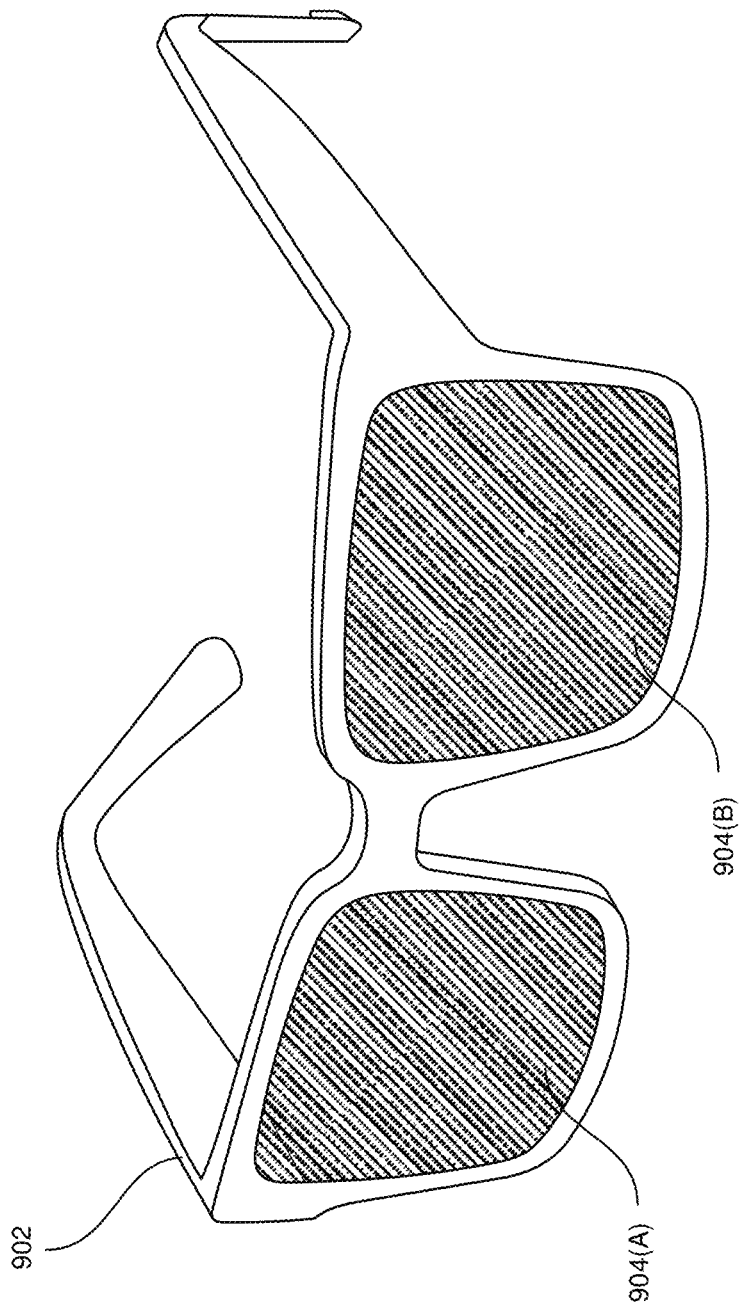
FIG. 9 illustrates a perspective view of a head mounted display system.

The embodiments discussed in this disclosure may also be implemented in AR systems that include one or more NEDs. For example, as shown in FIG. 9, AR system 900 may include a frame 902 configured to hold a left display device 904(A) and a right display device 904(B) in front of a user's eyes. Display devices 904(A) and 904(B) may act together or independently to present an image or series of images to a user. While AR system 900 includes two displays, embodiments of this disclosure may be implemented in AR systems with a single NED or more than two NEDs. AR system 900 may also include one or more input or output audio transducers (not shown).

As noted, some artificial reality systems may, instead of blending an artificial reality with actual reality, substantially replace one or more of a user's sensory perceptions of the real world with a virtual experience. One example of this type of system is a head-worn display system, such as VR system 1000 in FIG. 10, that mostly or completely covers a user's field of view. VR system 1000 may include a front rigid body 1002 and a band 1004 shaped to fit around a user's head. VR system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 900 and/or VR system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 900 and/or VR system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 800, AR system 900, and/or VR system 1000 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. In some examples, bone conduction transducers and/or cartilage conduction transducers may provide audio and/or haptic signals to a user. Traditionally, sound waves may travel through several structures in the ear before being translated and transmitted through the human nervous system to a user's brain. The sound waves may be transmitted to the cochlea as vibrations. The cochlea may convert the vibrations to electrical impulses that are sent along the auditory nerve to the brain. Bone conduction transducers and/or cartilage conduction transducers may bypass the eardrums and transmit audio and/or haptic signals by applying vibrations to a user's skin that may be received by the cochlea and induce an acoustic experience. Similarly, input audio transducers 810 may include condenser microphones, dynamic microphones, ribbon microphones, and/or any other type or form of input transducer. In some embodiments, a single transducer may be used for both audio input and audio output.

Figure 10:
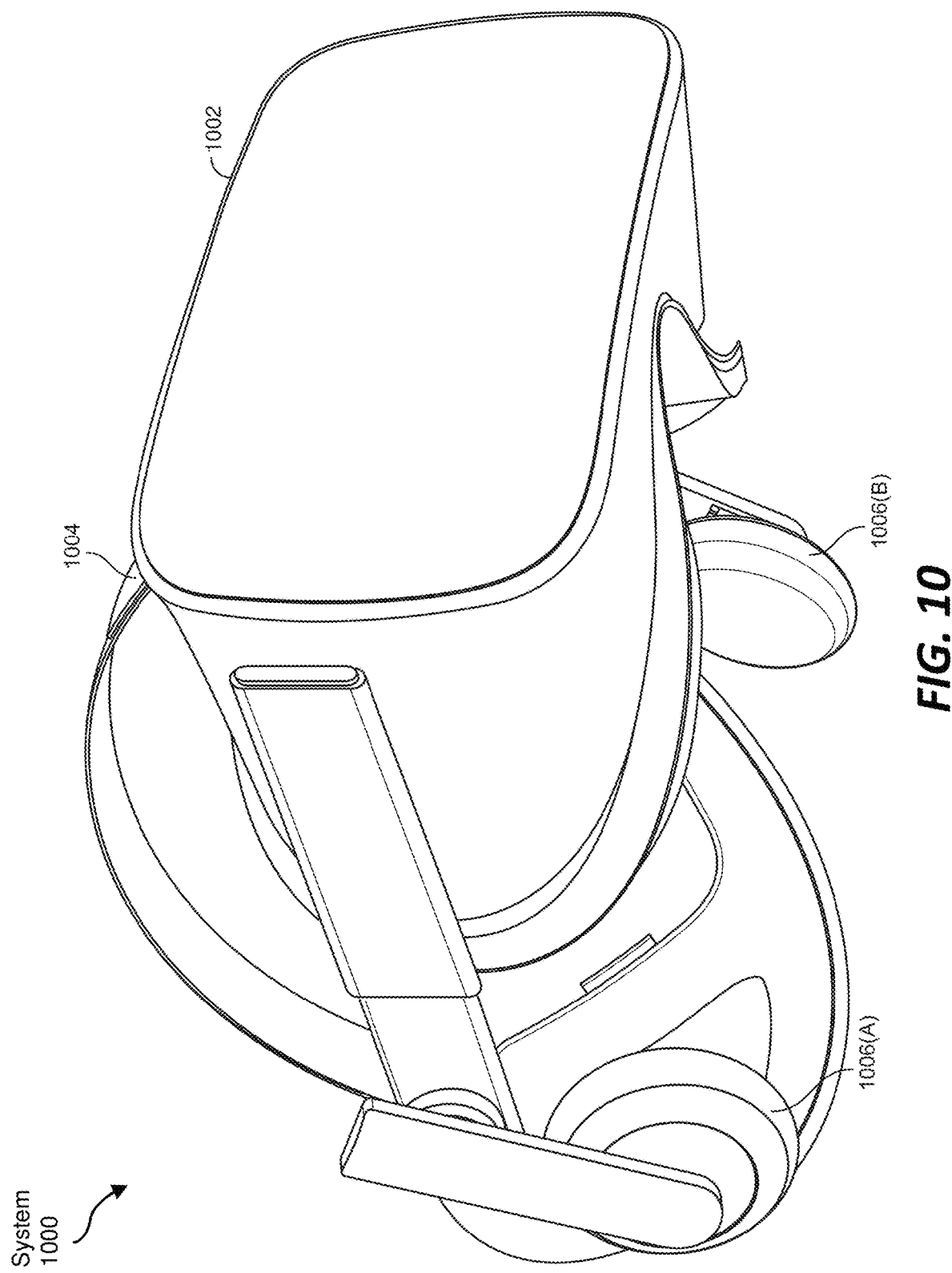
FIG. 10 illustrates a perspective view of a head mounted display system with audio reproduction.

While not shown in FIGS. 8-10, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of haptic signals to a human user including, without limitation, cutaneous feedback, vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 800, 900, and 1000 of FIGS. 8 and 9, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a direction of arrival (DOA) analysis to determine the location of a sound source. The DOA analysis may include analyzing the intensity, spectra, and/or arrival time of each sound at the AR/VR device to determine the direction from which the sounds originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy, including ear canal length and the positioning of the ear drum. The artificial reality device may provide an alignment and orientation guide, which the user may follow to customize the sound signal presented to the user based on their unique HRTF. In some embodiments, an artificial reality device may implement one or more microphones to listen to sounds within the user's environment. When estimating the direction of arrival for the sounds, the artificial reality device may refine the estimation based on the user's HRTF. That is, based on how that specific user hears sounds (according to the HRTF), the artificial reality device may alter a DOA estimation to indicate the location of a sound source specific to where that user would expect the sound to be coming from.

In addition to or as an alternative to performing a DOA estimation, an artificial reality device may perform localization based on information received from other types of sensors. These sensors may include cameras, IR sensors, heat sensors, motion sensors, GPS receivers, or in some cases, sensor that detect a user's eye movements. For example, as noted above, an artificial reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A method comprising:
   acquiring an audio signal;
   generating a haptic signal at frequencies that are based on a shift in frequencies of the audio signal, thereby causing the frequencies of the haptic signal to match the frequencies of the audio signal according to human perception, wherein generating the haptic signal is based on a downward shift in a subset of the frequencies of the audio signal; and
   providing the haptic signal to a human user via a haptic device in temporal synchrony with the audio signal being received by the human user.

2. The method of claim 1, wherein a relationship between the frequencies of the audio signal to the matched frequencies of the haptic signal according to human perception is non-linear.

3. The method of claim 1, wherein generating the haptic signal is based on a non-linear shift in a subset of the frequencies of the audio signal.

4. The method of claim 1, further comprising providing the audio signal to the human user.

5. The method of claim 1, wherein generating the haptic signal to cause the haptic signal to match human perception of the audio signal comprises frequency warping the audio signal.

6. The method of claim 1, wherein generating the haptic signal comprises shifting the frequencies of the haptic signal to compensate for a frequency response characteristic of a haptic device.

7. The method of claim 1, wherein generating the haptic signal at the frequencies that are based on the shift in the frequencies of the audio signal comprises a Hilbert transform.

8. The method of claim 1, further comprising generating the audio signal based on the shift in the frequencies of the haptic signal.

9. A system comprising one or more physical processors and one or more memories coupled to one or more of the physical processors, the one or more memories comprising instructions operable when executed by the one or more physical processors to cause the system to perform operations comprising:
   acquire an audio signal;
   generate a haptic signal at frequencies that are based on a shift in frequencies of the audio signal, thereby causing the frequencies of the haptic signal to match the frequencies of the audio signal according to human perception, wherein generating the haptic signal is based on a downward shift in a subset of the frequencies of the audio signal; and
   provide the haptic signal to a human user via a haptic device in temporal synchrony with the audio signal being received by the human user.

10. The system of claim 9, wherein a relationship between the frequencies of the audio signal to the matched frequencies of the haptic signal according to human perception is non-linear.

11. The system of claim 9, wherein generating the haptic signal is based on a non-linear shift in a subset of the frequencies of the audio signal.

12. The system of claim 9, further comprising providing the audio signal to the human user.

13. The system of claim 9, wherein generating the haptic signal to cause the haptic signal to match human perception of the audio signal comprises frequency warping the audio signal.

14. The system of claim 9, wherein generating the haptic signal comprises shifting the frequencies of the haptic signal to compensate for a frequency response characteristic of a haptic device.

15. The system of claim 9, wherein generating the haptic signal at the frequencies that are based on the shift in the frequencies of the audio signal comprises a Hilbert transform.

16. A non-transitory computer-readable medium comprising:
- computer-readable instructions that, when executed by at least one processor of a computing device, cause the computing device to:
  - acquire an audio signal;
  - generate a haptic signal at frequencies that are based on a shift in frequencies of the audio signal, thereby causing the frequencies of the haptic signal to match the frequencies of the audio signal according to human perception, wherein generating the haptic signal is based on a downward shift in a subset of the frequencies of the audio signal; and
  - provide the haptic signal to a human user via a haptic device in temporal synchrony with the audio signal being received by the human user.

17. The non-transitory computer-readable medium of claim 16, wherein a relationship between the frequencies of the audio signal to the matched frequencies of the haptic signal according to human perception is non-linear.

18. The non-transitory computer-readable medium of claim 16, wherein generating the haptic signal is based on a non-linear shift in a subset of the frequencies of the audio signal.

19. The non-transitory computer-readable medium of claim 16, wherein the computer-readable instructions further cause the computing device to provide the audio signal to the human user.

20. The non-transitory computer-readable medium of claim 16, wherein generating the haptic signal to cause the haptic signal to match human perception of the audio signal comprises frequency warping the audio signal.

\* \* \* \* \*